(12) United States Patent
Kaneko et al.

(10) Patent No.: US 12,576,716 B2
(45) Date of Patent: Mar. 17, 2026

(54) VEHICLE DISPLAY DEVICE AND DISPLAY CONTROL METHOD

(71) Applicant: TOYOTA JIDOSHA KABUSHIKI KAISHA, Aichi-ken (JP)

(72) Inventors: Tomohiko Kaneko, Yokohama (JP); Junichi Morimura, Shizuoka-ken (JP); Shun Maruyama, Numazu (JP); Ryoma Hiraike, Toyota (JP); Satoshi Omi, Ebina (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/784,933

(22) Filed: Jul. 26, 2024

(65) Prior Publication Data

US 2025/0050737 A1 Feb. 13, 2025

(30) Foreign Application Priority Data

Aug. 7, 2023 (JP) ................................. 2023-128670

(51) Int. Cl.
B60K 35/29 (2024.01)
B60K 35/22 (2024.01)
B60K 35/28 (2024.01)

(52) U.S. Cl.
CPC .............. B60K 35/29 (2024.01); B60K 35/22 (2024.01); B60K 35/28 (2024.01); *B60K 2360/164* (2024.01); *B60K 2360/175* (2024.01); *B60K 2360/182* (2024.01); *B60K 2360/5915* (2024.01)

(58) Field of Classification Search
CPC ........ B60K 35/29; B60K 35/22; B60K 35/28;

B60K 2360/164; B60K 2360/175; B60K 2360/182; B60K 2360/5915; B60K 2360/171; B60K 2360/179; B60K 2360/186; B60K 2360/48; B60K 35/10; B60K 35/81

See application file for complete search history.

(56) References Cited

U.S. PATENT DOCUMENTS

| | | | |
|---|---|---|---|
| 2017/0240098 A1 | 8/2017 | Sweeney et al. | |
| 2019/0050906 A1 | 2/2019 | Nomura et al. | |
| 2020/0065041 A1 | 2/2020 | Ichikawa et al. | |
| 2020/0329342 A1* | 10/2020 | Beaurepaire | B60K 35/29 |

FOREIGN PATENT DOCUMENTS

| | | |
|---|---|---|
| JP | 2016-065938 A | 4/2016 |
| JP | 2019-032681 A | 2/2019 |
| JP | 2019-515822 A | 6/2019 |
| JP | 2020-030361 A | 2/2020 |
| JP | 2021-157678 A | 10/2021 |

* cited by examiner

*Primary Examiner* — Yuen Wong
(74) *Attorney, Agent, or Firm* — HAUPTMAN HAM, LLP

(57) ABSTRACT

A vehicle display device having a processor that controls a display unit provided in the host vehicle, wherein the processor is configured to execute following processes, generating a display content, causing the display content to display on the display unit visible from at least one other vehicle existing around a host vehicle, determining an autonomous driving level of the other vehicle, adjusting the display content and generating a first display content according to the degree of manual driving included in autonomous driving level, and causing the display unit to display the first display content.

5 Claims, 5 Drawing Sheets

VEHICLE DISPLAY DEVICE AND DISPLAY CONTROL METHOD

RELATED APPLICATIONS

The present application claims priority of Japanese Patent Application No. 2023-128670 filed Aug. 7, 2023, the disclosure of which is hereby incorporated by reference herein in its entirety.

FIELD

Present disclosure relates to a vehicle display device and a display control method capable of displaying display contents outside the vehicle.

BACKGROUND

JP2021-157678A (Japanese Unexamined Patent Publication No. 2021-157678) describes a vehicle in which display contents having an advertising effectiveness are displayed on a display unit provided in the vehicle. The vehicle described in JP2021-157678A includes the display unit which are provided on outer surfaces of the vehicle and display the advertisements, and a control unit that controls a display mode of the display contents of the display unit.

According to the technique described in JP2021-157678A, in case of the driver of the other vehicle traveling around the vehicle gazes at the display contents, there is a possibility that the driving of the other vehicles are affected.

An object of the present disclosure is to provide a vehicle display device and a display control method capable of reducing an influence on driving of a driver of other vehicle existing around the host vehicle while improving an advertisement effect of display contents.

SUMMARY

According to an aspect of the present disclosure, there is provided a vehicle display device having a processor that controls a display unit provided in the host vehicle, wherein the processor is configured to execute following processes, generating a display content, causing the display unit to display the display content visible from at least one other vehicle existing around a host vehicle, determining an autonomous driving level of the other vehicle, adjusting the display content and generating a first display content according to the degree of manual driving included in autonomous driving level, and causing the display unit to display the first display content.

According to the present disclosure, it is possible to reduce the influence on the driving of the driver of the other vehicle existing around the host vehicle while improving the advertising effect of the display content.

DESCRIPTION OF EMBODIMENTS

Figure 1:
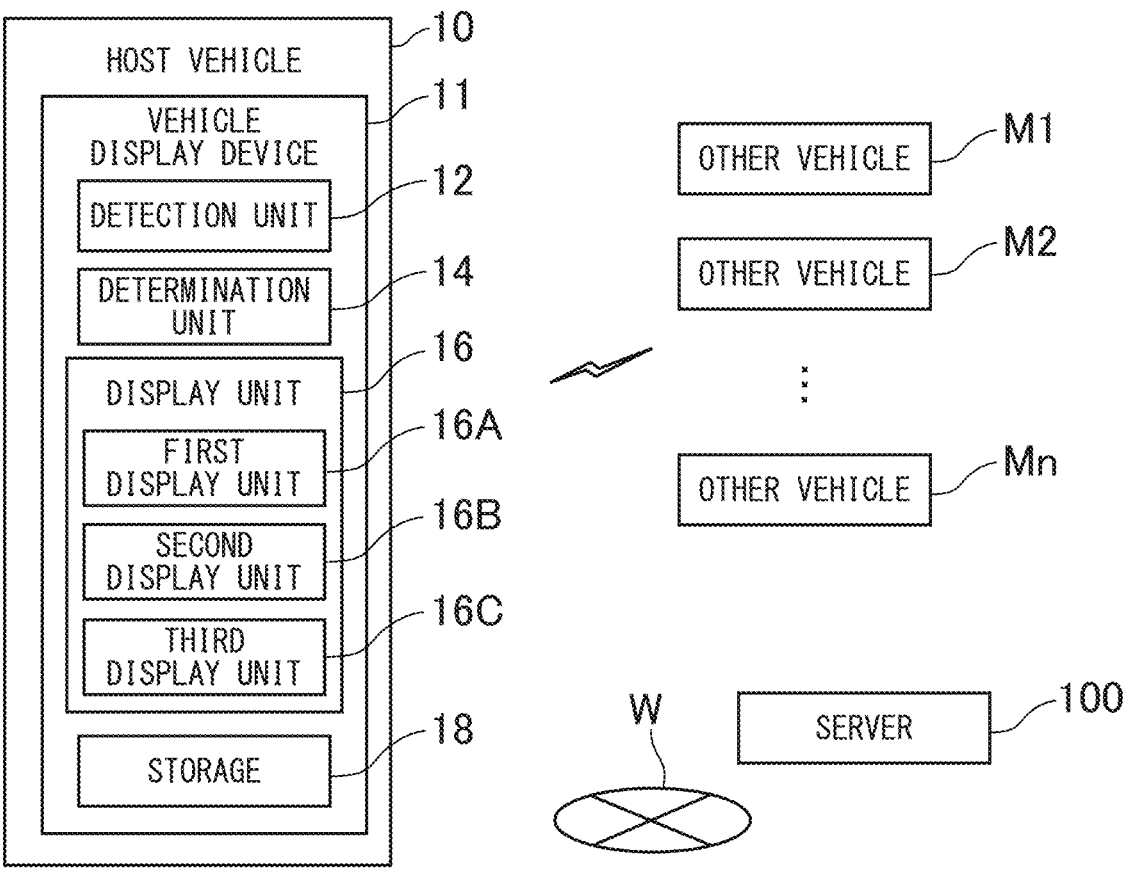
FIG. 1 is a block diagram showing a configuration of a vehicle display device according to an embodiment of the present disclosure.

As illustrated in FIG. 1, a host vehicle 10 is configured to be able to communicate with at least one other vehicle Mn (n is any natural number) existing in the surroundings based on vehicle-to-vehicle communication. The host vehicle 10 is provided with a vehicle display device 11 for displaying display contents such as advertising to the other vehicle Mn. The vehicle display device 11 includes, for example, a detection unit 12 that acquires data necessary for traveling. The vehicle display device 11 includes a determination unit 14 that executes a determination process using the detection data acquired by the detection unit 12. The vehicle display device 11 includes a display unit 16 that displays the display contents adjusted by the determination unit 14. The vehicle display device 11 includes a storage 18 that stores predetermined data.

The detection unit 12 includes, for example, communication interfaces that can wirelessly communicate with the other vehicle Mn, and sensors that acquire information around the host vehicle 10. The detection unit 12 performs vehicle-to-vehicle communication with the other vehicle Mn via the communication interface, and acquires datum related to the other vehicle Mn. The detection unit 12 may communicate with the other vehicles Mn via the network W. For example, the detection unit 12 acquires datum related to the traveling condition of the other vehicle Mn via the communication interface. The data relating to the traveling condition includes, for example, data relating to an autonomous driving level for performing autonomous traveling, data relating to a traveling mode for performing traveling assistance, and position data of the other vehicle Mn.

The autonomous driving level is, for example, defined in a predetermined stage, and a degree of manual driving included in each stage and a traveling area corresponding to each stage are set. In the traveling mode, for example, various functions for supporting the traveling of the vehicle are set. In the traveling mode, functions such as a following traveling following a vehicle, a deviation prevention assistance for preventing a vehicle from deviating from a lane, and a rear-end collision prevention support for a vehicle are set.

The detection unit 12 includes sensors such as a camera sensor, a LiDAR (Light Detection And Ranging sensor, and a position sensor. The detection unit 12 acquires information about the surroundings of the host vehicle 10 by sensors. The detection unit 12 is configured to be able to detect a detection target alone or by a combination of one or more sensors. The camera sensor captures an image of a road environment in which the host vehicle 10 travels and a state around the host vehicle 10 including a traffic participant and acquires imaging data. The traffic participants include vehicles, pedestrians, and the like existing around the host vehicle 10.

LiDAR sensor scans the surroundings of the host vehicle 10 using radar waves and acquires three-dimensional (3D) datum of objects such as traffic participants, structures, obstacles, and the like including the other vehicle Mn. The position sensor includes, for example, a GPS (Global Positioning System) sensor, and acquires the present position of the host vehicle 10 based on communication with the positioning satellites. The detection unit 12 may be configured by a sensor other than the above-described sensor if it can acquire the traveling state of the host vehicle 10 and information about the surroundings of the host vehicle 10.

The determination unit 14 includes a processor such as one or a plurality of CPU (Central Processing Unit) and peripheral circuitry thereof. The determination unit 14 may further include an arithmetic circuit that performs a logical operation or a numerical operation. The determination unit 14 executes various processes based on the computer program stored in the storage 18.

The determination unit 14 performs determination processing based on the data detected by the detection unit 12. The determination unit 14 adjusts the display content displayed on the display unit 16 based on the determination result. For example, the determination unit 14 determines the autonomous driving level of the other vehicle Mn based on the data detection by the detection unit 12. The determination unit 14 causes the display unit 16 to display the first display content obtained by adjusting the display content in accordance with the degree of manual driving included in the autonomous driving level.

The storage 18 is constituted by a non-temporary suitable storage medium such as a hard disk drive, a flash memory, or the like that stores data and programs necessary for processing by the determination unit 14. The storage 18 may be provided in the server 100 connected to the network W. The determination unit 14 may receive data from the server 100 via the network W. The display unit 16 is provided at a predetermined position of the host vehicle 10. The display unit 16 displays display content visible from at least one other vehicle Mn present around the host vehicle 10. The display unit 16 includes a display device such as a liquid crystal display capable of displaying an image. The display unit 16 may be combined with a projection device that projects an image on a road surface. The display unit 16 is controlled by the determination unit 14 and displays display contents.

Figure 2:
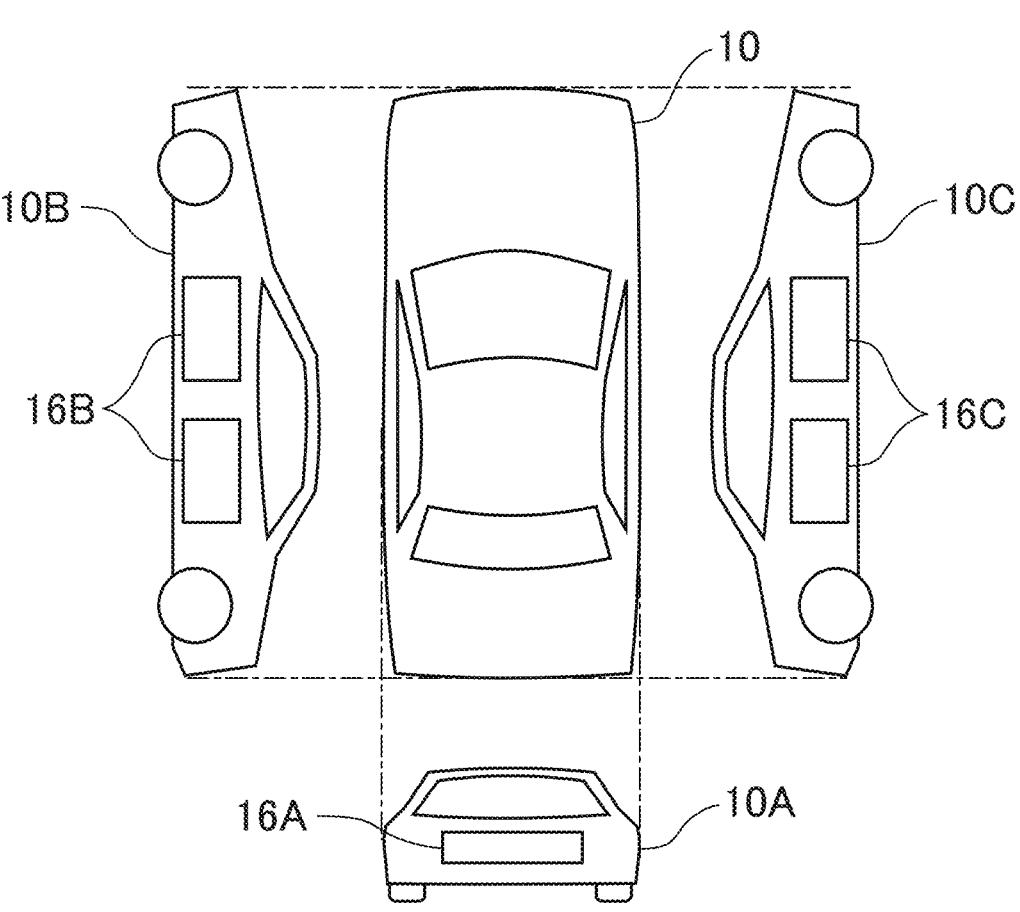
FIG. 2 is a diagram illustrating a position of a display unit provided in the host vehicle.

As illustrated in FIG. 2, the display unit 16 includes, for example, a plurality of display devices. The plurality of display devices is provided at different positions visible from the outside in the host vehicle 10.

On the rear surface 10A of the host vehicle 10, a first display device 16A that is visible toward the rear surface 10A (rear portion) of the host vehicle 10 is provided. The first display device 16A may be provided at a predetermined position in the vehicle that is visible from the outside of the vehicle through the rear window. On the left side surface 10B of the host vehicle 10, a second display device 16B that is visible toward the left side surface 10B of the host vehicle 10 is provided. The second display device 16B may be divided according to the number of doors provided on the left side surface 10B of the host vehicle 10.

On the right-side surface 10C of the host vehicle 10, a third display device 16C that is visible toward the right-side surface 10C of the host vehicle 10 is provided. The third display device 16C may be divided according to the number of doors provided on the right-side surface 10C of the host vehicle 10. The number and the position of the display unit 16 described above are examples and may be configured by different numbers and arranged at different positions if they can be visually recognized from the outside of the host vehicle 10. The display unit 16 may be formed in any shape or number according to conditions such as the type, shape, and installation position of the host vehicle 10.

Display contents of the same content are displayed on the first display device 16A, the second display device 16B, and the third display device 16C. The first display device 16A, the second display device 16B, and the third display device

16C may display different-content information according to an installation position that can be visually recognized by the other vehicle Mn.

Figure 3:
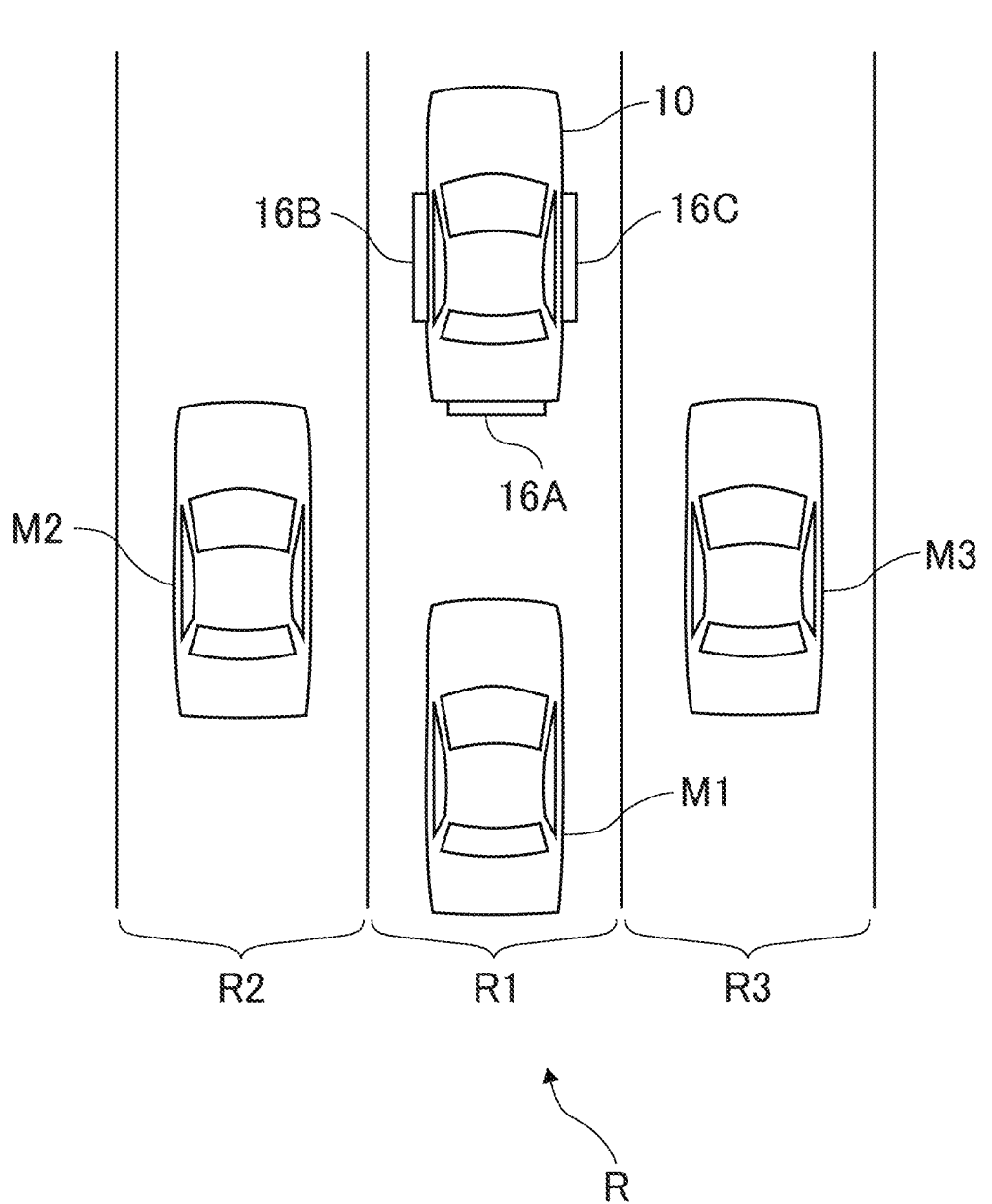
FIG. 3 is a diagram illustrating a positional relationship between a host vehicle traveling in a plurality of lanes and other vehicle.

FIG. 3 shows a road R provided with a plurality of lanes. The road R is provided with, for example, a first lane R1 on which the host vehicle 10 travels, a second lane R2 and a third lane R3 adjoining the first lane R1. The second lane R2 adjoins, for example, the left side of the first lane R1. The third lane R3 adjoins, for example, the right side of the first lane R1. Other vehicle M1 is traveling behind the host vehicle 10 traveling in the first lane R1. In the second lane R2, for example, other vehicle M2 is traveling. In the third lane R3, for example, other vehicle M3 is traveling.

For example, the determination unit 14 recognizes the road environment around the host vehicle 10 based on the imaging data captured by the camera sensor included in the detection unit 12. The determination unit 14 recognizes the shape of the road R on which the host vehicle 10 is traveling, the number of lanes, and the lane on which the host vehicle 10 is traveling, based on the imaging data. The determination unit 14 recognizes the positional relationship between the lane on the road R and the host vehicle. Based on the three-dimensional data acquired by LiDAR sensor included in the detection unit 12, the determination unit 14 determines the other vehicle Mn existing around the host vehicle 10 and generates position information of the other vehicle Mn traveling around the host vehicle 10. The determination unit 14 recognizes the relative positional relation between the host vehicle 10 and the other vehicle Mn based on the positional information of the other vehicle Mn and the positional information of the host vehicle 10. The determination unit 14 may compensate for the relative positional relation between the host vehicle 10 and the other vehicle Mn by using the positional information of the other vehicle Mn acquired by the detection unit 12.

The determination unit 14 acquires the autonomous driving level of the other vehicles M1-M3 based on the inter-vehicle communication datum by the detection unit 12. The determination unit 14 determines the autonomous driving level of the other vehicle Mn, for example, based on the autonomous driving level data. For example, the determination unit 14 determines whether the degree of manual driving included in the stage of the autonomous driving level is equal to or greater than a threshold value. The degree of manual driving indicates the degree to which the driver of the other vehicle Mn intervenes in the driving of the other vehicle Mn. The higher the degree of manual driving, the lower the degree of autonomous driving of the driver with respect to the driving of the other vehicle Mn, and the higher the degree of responsibility of the driver with respect to the driving. The lower the degree of manual driving, the higher the degree of autonomous driving of the driver with respect to the driving of the other vehicle Mn, and the lower the degree of liability of the driver with respect to the driving.

In case of the degree of manual driving is less than the threshold, the determination unit 14 determines that the degree of autonomous driving of the other vehicle Mn is higher and causes the display unit 16 to display the display content. Based on the determination result of the autonomous driving level, in case of the degree of manual driving is less than the threshold value, the determination unit 14 determines that the driving of the other vehicle Mn is not affected even if the driver of the other vehicle Mn gazes and causes the display unit 16 to display the display content. The display content is, for example, an electronic advertisement based on an image, or a moving image displayed on the display unit 16. The display content may include a two-dimensional code or a URL (Uniform Resource Locator) of a website that is guided to the contact of the advertiser.

The determination unit 14 may acquire the attribute data of the occupant of the other vehicles M1-M3 based on the inter-vehicle communication performed by the detection unit 12, select the display content corresponding to the attribute data, and cause the display unit 16 to display the attribute data. In case of the degree of manual driving is equal to or greater than the threshold value, the determination unit 14 causes the display unit 16 to display the first display content obtained by adjusting the display content. In case of the degree of manual driving is equal to or greater than the threshold based on the determination of the autonomous driving level, the determination unit 14 determines that the driving of the other vehicle Mn is affected in case of the driver of the other vehicle Mn gazes and causes the display unit 16 to display the first display content in which the display content is restricted. The first display content is, for example, a screen display in which the display content is erased in the display unit 16, or a screen display generated so that the possibility of being watched by the driver without including information such as characters is low.

The determination unit 14 adjusts the display content based on the positional relation of the other vehicle Mn around the host vehicle 10. For a plurality of display devices (the first display device 16A, the second display device 16B, and the third display device 16C) provided at a plurality of different positions of the host vehicle 10, the determination unit 14 causes the display content corresponding to the autonomous driving level to be displayed for each of the plurality of display devices provided at a plurality of different positions of the host vehicle 10 based on the positional relation of the other vehicle Mn.

Even in case of the degree of manual driving is high at the autonomous driving level, the driver of the other vehicle M1 that follows the host vehicle 10 in the first lane R1 is driving the other vehicle M1 by gazing at the preceding host vehicle 10. For example, the determination unit 14 causes the display content to be displayed on the first display device 16A installed on the rear 10A (rear side) of the host vehicle 10, regardless of the autonomous driving level, for the other vehicle M1 that follows the host vehicle 10 in the first lane R1.

In case of the display content is being displayed on the first display device 16A regardless of the autonomous driving level, the determination unit 14 causes the second display content indicating an alert to be displayed at a predetermined timing. The second display content is, for example, an image display including character information such as "attention".

For example, the determination unit 14 determines the autonomous driving level for the other vehicle M2 that runs in parallel with the host vehicle 10 in the second lane R2. In case of the degree of manual driving is less than the threshold value, the determination unit 14 causes the second display device 16B to display the display content based on the determination result of the autonomous driving level of the other vehicle M2. In case of the degree of manual driving is greater than or equal to the threshold based on the determination of the autonomous driving level of the other vehicle M2, the determination unit 14 causes the second display device 16B to display the first display content in which the display content is limited.

The determination unit 14 determines the length of the distance between the host vehicle 10 and the other vehicle Mn based on the detection result of the detection unit 12 and displays the display content or the first display content according to the length of the distance between the host vehicle 10 and the other vehicle Mn.

The determination unit 14 determines the length of the distance between the host vehicle 10 and the other vehicle M2 based on the position of the other vehicle M2. Based on the length of the distance between the position of the other vehicle M2 and the host vehicle 10 and the other vehicle M2, the determination unit 14 determines whether the other vehicle M2 travels at the rear position relative to the host vehicle 10 and the second display device 16B enters the field of view of the driver of the other vehicle M2. The determination unit 14 may cause the display content to be displayed on the second display device 16B even if the degree of manual driving is equal to or greater than a threshold value in case of the other vehicle M2 travels at a position behind the host vehicle 10 and determines that the second display device 16B does not enter the field of view of the driver of the other vehicle M2.

The determination unit 14 may cause the first display device 16A to display the first display content in which the display content is restricted in case of the other vehicle M2 travels at a position behind the host vehicle 10 and determines that the first display device 16A enters the field of view of the driver of the other vehicle M2 based on the determination result of the position of the other vehicle M2 and the length of the distance between the host vehicle 10 and the other vehicle M2.

Similarly, for example, the determination unit 14 determines the autonomous driving level for the other vehicle M3 that runs in parallel with the host vehicle 10 in the third lane R3. In case of the degree of manual driving is less than the thresholds based on the determination of the autonomous driving level of the other vehicle M3, the determination unit 14 causes the third display device 16C to display the display content. In case of the degree of manual driving is equal to or greater than the threshold based on the determination of the autonomous driving level of the other vehicle M3, the determination unit 14 causes the third display device 16C to display the first display content in which the display content is limited.

The determination unit 14 determines the length of the distance between the host vehicle 10 and the other vehicle M3 based on the position of the other vehicle M3. The determination unit 14 determines whether the other vehicle M3 travels at a position behind the host vehicle 10 and the third display device 16C enters the field of view of the driver of the other vehicle M3. The determination unit 14 may cause the third display device 16C to display the display content even if the degree of manual driving is equal to or greater than the threshold value in case of the other vehicle M3 travels at a position behind the host vehicle 10 and determines that the third display device 16C does not enter the field of view of the driver of the other vehicle M3.

The determination unit 14 may cause the first display device 16A to display the first display content in which the display content is restricted in case of the other vehicle M3 travels at a position behind the host vehicle 10 and determines that the first display device 16A enters the field of view of the driver of the other vehicle M3 based on the determination result of the position of the other vehicle M3 and the length of the distance between the host vehicle 10 and the other vehicle M3.

According to the vehicle display device 11, the display content displayed on the display unit 16 is adjusted based on the autonomous driving level of the other vehicle Mn, and the display content is displayed on the display unit 16 without affecting the driving of the driver of the other vehicle Mn, thereby improving the advertising effectiveness. According to the vehicle display device 11, the display content displayed on the display unit 16 is adjusted based on the autonomous driving level and the position of the other vehicle Mn, and the display content is displayed on the display unit 16 without affecting the driving of the driver of the other vehicle Mn, thereby improving the advertising effectiveness.

The determination unit 14 may adjust the display content displayed on the display unit 16 based on the traveling condition of the other vehicle Mn. In case of the other vehicle Mn is stopped, the driver of the other vehicle Mn is not driving, and thus the display content can be displayed on the display unit 16. The determination unit 14 determines whether the other vehicle Mn is stopped based on the detection result of the detection unit 12. In case of determining that the other vehicle Mn is stopped, the determination unit 14 causes the display unit 16 to display the display content.

According to the vehicle display device 11, in case of the other vehicle Mn is stopped, it is possible to improve the advertising effectiveness by displaying the display content on the display unit 16 without affecting the driving of the driver of the other vehicle Mn.

The determination unit 14 may adjust the display content displayed on the display unit 16 based on the traveling mode of the other vehicle Mn. For example, the determination unit 14 determines the driving mode of the subsequent other vehicle M1 based on the detection result of the detection unit 12. For example, in case of the other vehicle M1 is traveling in the traveling mode of the following traveling following the host vehicle 10, the driver of the other vehicle M1 is less responsible for driving, and the display content can be displayed on the first display device 16A. In case of the determination unit 14 determines that the following other vehicle M1 is traveling in accordance with the traveling mode of the following traveling following the host vehicle 10, the display content is displayed on the first display device 16A regardless of the autonomous driving level of the other vehicle M1.

The determination unit 14 may cause the second display device 16B to display the display content even in case of the other vehicle M2 is traveling in the second lane R2 in accordance with the traveling mode of the following traveling. Similarly, the determination unit 14 may cause the third display device 16C to display the display content even in case of the other vehicle M3 is traveling in the traveling mode of the following traveling in the third lane R3. According to the vehicle display device 11, in case of the other vehicle Mn is traveling in the traveling mode of the following traveling following the host vehicle 10, the display content can be displayed on the display unit 16 without affecting the driving of the driver of the other vehicle Mn, thereby improving the advertising effectiveness.

In case of the autonomous driving level of the other vehicle Mn cannot be determined based on the detection result of the detection unit 12, the determination unit 14 determines that the other vehicle Mn is a manual driving vehicle and causes the display unit 16 to display the first display content in which the display content is limited.

According to the vehicle display device 11, in case of the other vehicle Mn cannot determine the autonomous driving level of the host vehicle 10, the driver's driving effect can be reduced by displaying the display content on the display unit 16.

Figure 4:
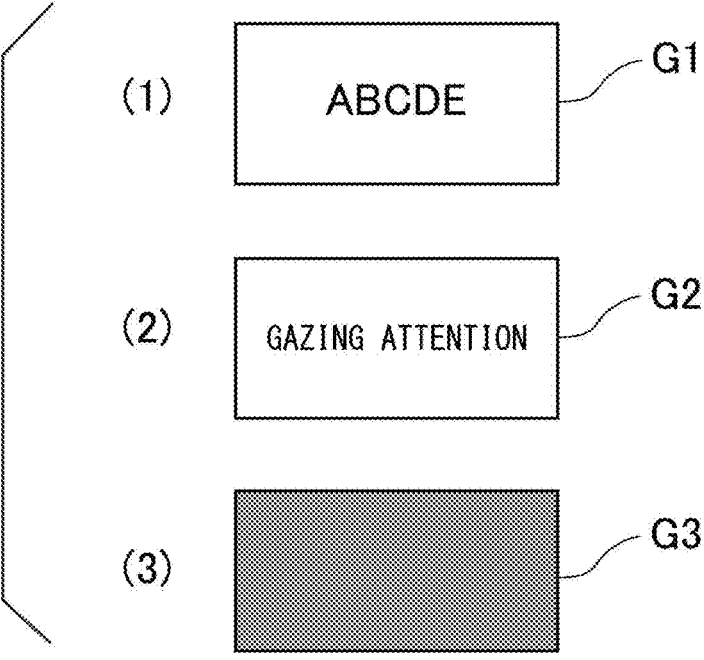
FIG. 4 is a diagram illustrating display contents displayed on the display unit.

FIG. 4 (1) illustrates display content G1 displayed on the display unit 16. The display content G1 includes advertising content such as text. The display content G1 may be a static image or a dynamic image. FIG. 4 (2) illustrates a second display content G2 displayed at a predetermined timing while the display content G1 is displayed. The second display content G2 includes content indicating an alert based on character information or the like. The second display content G2 may be a static image or a dynamic image.

FIG. 4 (3) shows the first display content G3 displayed on the display unit 16. The first display content G3 includes, for example, a screen display in which the display content is deleted. The first display content G3 may be a static image or a dynamic image. The determination unit 14 can improve the advertising effectiveness of the display content G1 by appropriately displaying the display content G2, the second display content G3, and the first display content G2, and can reduce the impact on the driver's driving of the other vehicle Mn.

Figure 5:
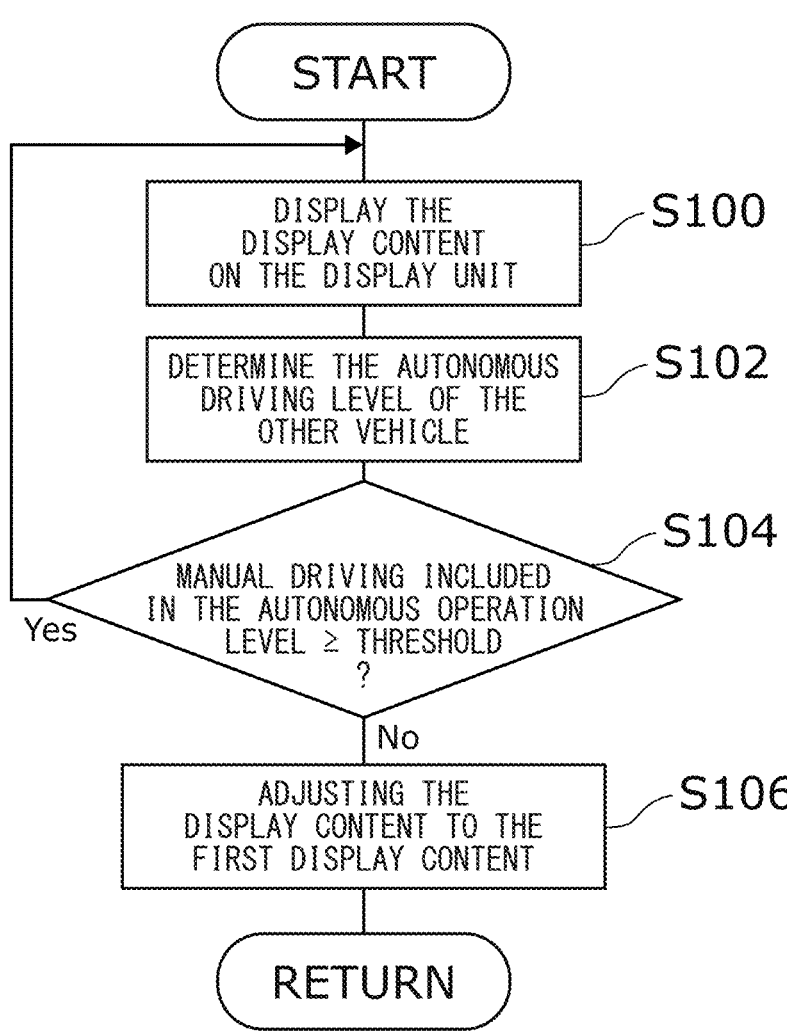
FIG. 5 is a flowchart illustrating a flow of processing of the display control method executed in the vehicle display device.

FIG. 5 shows a flow of processing of the display control method executed in the vehicle display device 11. The display control method is executed by the processor based on a computer program installed in each configuration of the vehicle display device 11. The computer program causes the processor constituting the determination unit 14 to execute the following processes. The determination unit 14 generates visible display content from at least one other vehicle Mn existing around the host vehicle 10 and causes the display unit 16 to display the visible display content (S100). The determination unit 14 communicates with the other vehicle Mn and determines the autonomous driving level of the other vehicle Mn (S102). The determination unit 14 determines whether the degree of manual driving included in the autonomous driving level of the other vehicle Mn is equal to or greater than the threshold (S104). In case of the degree of manual driving included in the autonomous driving level is less than the threshold value, the determination unit 14 causes the display unit 16 to display the first display content obtained by adjusting the display content (S106). In case of the degree of manual driving included in the autonomous driving level is equal to or greater than the threshold, the determination unit 14 returns the process to the S100 and causes the display unit 16 to display the display content continuously.

In the above-described embodiment, the determination unit 14 may be provided not only on the host vehicle 10 but also on the server 100 side. In this case, the determination unit 14 may determine the autonomous driving level of the other vehicle Mn based on the detection data acquired by the detection unit 12 via the network W and display the first display content G3 on the display unit 16 according to the degree of manual driving included in the autonomous driving level. The computer program executed in each configuration of the vehicle display device 11 may be provided in a form recorded in a non-transitory computer-readable recording medium such as a semiconductor memory, a magnetic recording medium, or an optical recording medium.

The invention claimed is:

1. A vehicle display device having a processor that controls a display unit provided in a host vehicle, wherein the processor is configured to execute:

generating a display content;

causing the display unit to display the display content on an outside surface of the host vehicle visible from at least one other vehicle existing around the host vehicle;

determining an autonomous driving level of the at least one other vehicle;

adjusting the display content and generating a first display content according to a degree of manual driving included in the autonomous driving level; and causing the display unit to display the first display content.

2. The vehicle display device according to claim 1, wherein the processor is configured to execute:

causing the display unit to display the first display content in case of determining result that a driver of one of the at least one other vehicle is not affected by the first display content based on the detection result of a position of the one of the at least one other vehicle.

3. The vehicle display device according to claim 1, wherein the processor is configured to execute:

causing the display unit to display the first display content in case of one of the at least one other vehicle is stopped.

4. The vehicle display device according to claim 1, wherein the processor is configured to execute:

in case of the processor determines that one of the at least one other vehicle following another one of the at least one other vehicle is in a traveling mode following the host vehicle, causing the display unit to display the first display content regardless of the autonomous driving level of both the one of the at least one other vehicle and the another one of the at least one other vehicle.

5. A display control method executed by a computer which controls a display unit provided in a host vehicle, the computer is configured to execute:

generating a display content;

causing the display unit to display the display content on an outside surface of the host vehicle visible from at least one other vehicle existing around the host vehicle;

determining an autonomous driving level of the at least one other vehicle;

adjusting the display content and generating a first display content according to a degree of manual driving included in the autonomous driving level; and causing the display unit to display the first display content.

\* \* \* \* \*